UNITED STATES PATENT OFFICE 2,314,454

PRODUCTION OF ESTERS OF HALOGEN ALCOHOLS

Friedrich Manchen and Willi Schmidt, Ludwigshafen-on-the-Rhine, Germany, assignors, by mesne assignments, to General Aniline & Film Corporation, New York, N. Y., a corporation of Delaware No Drawing. Application August 9, 1939, Serial No. 289,174. In Germany August 19, 1938

7 Claims. (Cl. 260—463)

The present invention relates to esters of halogen alcohols and a process of producing same.

We have found that esters of halogen alcohols are obtained in a simple manner by causing cyclic ethers of the dihydro and tetrahydrofurane series to react with carboxylic acid halides including phosgene.

Cyclic ethers suitable as initial materials are in particular tetrahydrofurane itself and dihydrofurane itself and their derivatives, as for example 2.3-dichlortetrahydrofurane, and also their homologues, as for example mono- and di-alkylated di-hydrofuranes and tetraalkylated tetrahydrofuranes, such as 2.5-dimethyltetrahydrofurane, 2.2.5.5-tetramethyltetrahydrofurane, and also tetrahydrofurfuryl alcohol or oxetone. Among carboxylic acid halides there may be mentioned acetyl chloride, acetyl bromide, acetyl iodide, chloracetyl chloride, butyric acid chloride, lauric acid chloride, oleic acid chloride, benzoyl chloride or phenylacetic acid chloride, and also the chlorides of polybasic carboxylic acids, such as succinic acid chloride or phthalyl chloride, and also phosgene.

The reaction proceeds, for example when starting from tetrahydrofurane and acetyl chloride, according to the following equation:

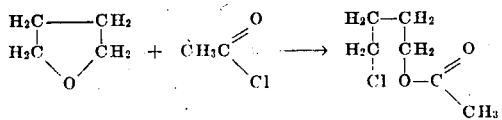

Dihydrofurane and acetylchloride react according to the following equation:

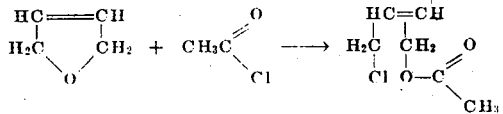

Depending on the reactivity of the initial materials, the reaction sets in more or less rapidly and readily when the reactants are brought together in the liquid state. For example if tetrahydrofurane be mixed with acetyl chloride, the reaction commences at room temperature with the formation of 4-chlor-butyl acetate. Other carboxylic acid chlorides, as for example chlorides of aromatic carboxylic acids, such as benzoyl chloride, react less rapidly so that in this case the mixture of the initial materials is preferably heated. The reaction is often attended by great evolution of heat. In this case a diluent which does not impair the reaction, as for example aliphatic and aromatic hydrocarbons, may be used or an excess of one of the initial materials may be used. By adding catalysts, as for example substances capable of promoting the splitting off of hydrogen halide, such as zinc or magnesium, zinc chloride, aluminium chloride or also iodine, the reaction may readily be initiated and accelerated.

The reaction in the liquid phase may also be rendered continuous by allowing appropriate amounts of the initial materials to flow together and then allowing the mixture to flow through a tube system, for example, which is kept at the necessary temperature.

The process may also be carried out in the gas phase, when starting from acid halides, which are stable above their boiling point. In this case also it is possible to work with the aid of catalysts and/or in the presence of diluents. It is also possible to work under increased or reduced pressure.

The compounds prepared according to this invention may be used as solvents or as plasticizers for organic film-forming materials.

The following examples will further illustrate how this invention may be carried out in practice but the invention is not restricted to these examples. The parts are by weight.

Example 1

144 parts of tetrahydrofurane, to which a little zinc chips or zinc dust has been added, are placed in a flask provided with a reflux condenser and then 158 parts of acetyl chloride are allowed to flow in slowly at room temperature. The reaction commences vigorously immediately. The temperature at first rises slowly to 80° C. and towards the end of the reaction rapidly to 150° C. After cooling, the reaction mixture is washed with dilute soda solution in order to remove small amounts of acetic acid formed, dried and distilled. There are thus obtained 300 parts of 4-chlor-butyl acetate, boiling point from 92° to 94° C. at 22 millimeters (mercury gauge). The yield amounts to 99 per cent of the theoretical yield.

The reaction may also be carried out without catalyst. In this case the mixture of the components is heated for 5 hours to 150° C. in a pressure vessel. By working up there is obtained 4-chlorbutyl acetate in an 85 per cent yield.

Example 2

432 parts of tetrahydrofurane are heated to about 100° C. Some magnesium chips are then introduced and 420 parts of benzoyl chloride are allowed to flow in. The reaction commences slowly after a few minutes and then proceeds rapidly. When it is completed, the excess of tetrahydrofurane is distilled off, the product washed with sodium carbonate and distilled. 4-chlorbutyl benzoate having a boiling point of from 176° to 178° C. at 20 millimeters (mercury gauge) is thus obtained in a 90 per cent yield.

Example 3

200 parts of normal-butyric acid chloride are allowed to flow slowly into 140 parts of tetrahydrofurane to which 1 part of anhydrous zinc chloride has been added. The mixture heats up slowly until at the end of the reaction it has attained a temperature of 150° C. By distillation, 4-chlorbutyl butyrate having a boiling point of from 116° to 118° C. at 21 millimeters (mercury gauge) is obtained in an 87 per cent yield.

Example 4

A little anhydrous aluminium chloride is added to 90 parts of 2.3-dichlortetrahydrofurane and then 40 parts of acetyl chloride are slowly added. By working up as described above, 2.3.4-trichlorbutyl acetate having a boiling point of from 154° to 158° C. is obtained in a good yield.

Example 5

160 parts of acetyl chloride are allowed to flow slowly into a solution of 140 parts of dihydrofurane in 100 parts of benzene to which a small amount of iodine has been added. By working up, 4-chlor-2.3-butenyl acetate having a boiling point of from 93° to 94° C. at 24 millimeters (mercury gauge) is obtained in a good yield.

Example 6

A little zinc is added to a mixture of 144 parts of tetrahydrofurane and 200 parts of toluene and then 203 parts of phthalylchloride are allowed to run in. By working up the reaction mixture, phthalic acid-4-chlorbutyl ester is obtained in a 75 per cent yield.

Example 7

157 parts of acetyl chloride are gradually added to a solution of 102 parts of tetrahydrofurfuryl alcohol in 200 parts of benzene. When the originally very vigorous reaction has moderated, a little zinc dust is added. When the reaction is completed, the reaction mixture is worked up in the above-mentioned manner and an oily liquid boiling at from 158° to 160° C. under a pressure of 26 millimeters (mercury gauge) and having the composition $C_9H_{15}O_4Cl$ is obtained. The compound probably corresponds to the constitution:

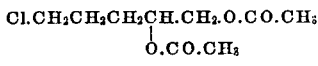

I or

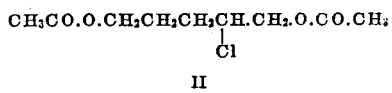

II

Example 8

The vapors of 72 parts of tetrahydrofurane and 80 parts of acetyl chloride are led through a tube filled with glass beads and small pieces of metallic zinc, 4-chlorbutyl acetate is obtained in almost a quantitative yield.

Instead of the said filling for the tube, there may be used aluminium grit or metallic Raschig rings with or without admixture with indifferent fillers, as for example glass rings or pumice.

Example 9

Phosgene is led at room temperature into 360 parts of tetrahydrofurane to which a little zinc has been added until further reaction cannot be observed. At the end of the reaction the temperature of the reaction mixture is 60° C. The neutral carbonic acid ester of 4-chlorbutanol is obtained in a good yield.

What we claim is:

1. A process for the production of esters of halogen-alcohols which consists in bringing into contact at reaction temperature a cyclic ether of the dihydro- and tetrahydrofurane series with a carboxylic acid halide.

2. A process for the production of esters of chlor-alcohols which consists in bringing into contact in the liquid phase at reaction temperature a cyclic ether of the dihydro- and tetrahydrofurane series with a carboxylic acid chloride.

3. A process for the production of esters of chlor-alcohols which consists in bring into contact in the liquid phase at reaction temperature a cyclic ether of the dihydro- and tetrahydrofurane series with acetyl chloride.

4. A process for the production of esters of chlor-alcohols which consists in bringing into contact in the liquid phase at reaction temperature tetrahydrofurane with acetyl chloride.

5. A process for the production of esters of halogen-alcohols which consists in bringing into contact in the liquid phase tetrahydrofurane with phosgene.

6. A process for the production of esters of chlor-alcohols which consists in bringing into contact in the liquid phase tetrahydrofurane with a carboxylic acid chloride.

7. A process for the production of esters of halogen-alcohols which consists in bringing a cyclic ether of the dihydro- and tetrahydrofurane series into contact with phosgene at reaction temperature.

FRIEDRICH MANCHEN.
WILLI SCHMIDT.